US008429019B1

(12) United States Patent
Yeatts et al.

(10) Patent No.: US 8,429,019 B1
(45) Date of Patent: Apr. 23, 2013

(54) SYSTEM AND METHOD FOR SCHEDULED DELIVERY OF SHIPMENTS WITH MULTIPLE SHIPMENT CARRIERS

(75) Inventors: Matthew A. Yeatts, Bellevue, WA (US); Neha Goswami, Seattle, WA (US); Andrew Korytko, Seattle, WA (US); Michael Seifert, Mercer Island, WA (US); Charles M. Griffith, Bainbridge Island, WA (US); Girish S. Lakshman, Issaquah, WA (US); Gregory Ignatov, Bellevue, WA (US); Trenton M. Tatro, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 369 days.

(21) Appl. No.: 12/725,347

(22) Filed: Mar. 16, 2010

Related U.S. Application Data

(60) Provisional application No. 61/255,901, filed on Oct. 29, 2009.

(51) Int. Cl.
*G06Q 30/00* (2012.01)
(52) U.S. Cl.
USPC ........................................ 705/26.1; 705/27.1
(58) Field of Classification Search ................. 705/26, 705/27, 26.1, 27.1
See application file for complete search history.

(56) References Cited

U.S. PATENT DOCUMENTS

| 5,615,121 | A | | 3/1997 | Babayev et al. |
| 5,839,117 | A | * | 11/1998 | Cameron et al. ............. 705/27.1 |
| 6,701,299 | B2 | | 3/2004 | Kraisser et al. |
| 7,587,345 | B2 | * | 9/2009 | Mann et al. ................... 705/28 |
| 7,653,688 | B2 | * | 1/2010 | Bittner ........................... 709/204 |
| 8,073,723 | B1 | * | 12/2011 | Bilibin et al. .................. 705/7.13 |
| 2004/0176962 | A1 | * | 9/2004 | Mann et al. ....................... 705/1 |
| 2004/0230601 | A1 | * | 11/2004 | Joao et al. ...................... 707/102 |
| 2010/0235210 | A1 | * | 9/2010 | Nadrotowicz, Jr. ............... 705/8 |

OTHER PUBLICATIONS

Online Shopping Priorities Shifting From Best Merchandise Price to Total Transaction Cost and Fulfillment Services, Pr Newswire [New York] Jul. 25, 2000, downloaded from ProQuestDirect on the Internet on Dec. 16, 2012, 3 pages.*
Business Holiday Shipping Is a Breeze with Airborne Express Enhanced Services, PR Newswire [New York] Nov 21, 2002, downloaded from ProQuestDirect on the Internet on Dec. 16, 2012, 3 pages.*

(Continued)

*Primary Examiner* — James Zurita
(74) *Attorney, Agent, or Firm* — Robert C. Kowert; Meyertons, Hood, Kivlin, Kowert & Goetzel, P.C.

(57) ABSTRACT

Various embodiments of a system and method for scheduled delivery of shipments with multiple shipment carriers are described. Various embodiments may include a scheduled delivery component configured to receive delivery availability information for multiple shipment carriers. In various embodiments, for each shipment carrier, delivery availability information may specify one or more delivery periods during which that shipment carrier is available to deliver shipments of one or more items to designated locations. This delivery availability information may be utilized to generate a scheduled delivery tool that enables users to select a particular delivery period during which an item is to be delivered. The scheduled delivery tool may provide multiple selectable delivery periods based on the delivery availability information of multiple shipment carriers. The scheduled delivery component may determine that a particular delivery period has been selected and generate a delivery instruction based on such selection.

30 Claims, 8 Drawing Sheets

OTHER PUBLICATIONS

"Schedule My Delivery," Copyright 2010 Manna freight Systems, Inc., found at http://www.manna.com/SCHEDULE/tracking.aspx.

"Best Buy Outlet Center," Best Buy, Copyright 2003-2010, found at http://www.bestbuy.com/site/olspage.jsp?type=p.&contentId=1142292388976&id=cat12098.

"Your M&S: Delivery Options," Copyright 2010 Marks and Spencer, fournd at http://www.marksandspencer.com/Delivery-Options-Delivery-Help/b/43695031.

Argos, "Home Delivery," Copyright Argos Limited 2010, found at http://www.argos.co.uk/static/StaticDisplay/includeName/OrderingForHomeDelivery.htm.

* cited by examiner

FIG. 5

Review the information below, then click "Place your order."

Shipping to:
John Smith
1234 Elm St
Seattle, WA 98101

Shipping options
○ Shipment carrier contacts customer to establish delivery appointment
● Schedule Delivery [Dec 4, 2008 (9-11am) ▾] 🗓

Scheduled delivery for this item: Saturday, December 4, 2009 at 9-11am

Need to ( Change quantities or delete ) ?

Order Summary
Items: $2799.99
Shipping & Handling: $0.00
Estimated Tax:* $0.00

Order total: $2799.99
You got free shipping!

Payment Method: ( Change )
Credit card: ****-9999
Exp: 10/2009

Billing address: ( Change )
John Smith
1234 Elm St
Seattle, WA 98101

(△ Place your order)

Configure a delivery calendar

Use the form below to configure this delivery calendar. Click Save & Preview Calendar when finished to preview this calendar.

| | | |
|---|---|---|
| Delivery Calendar Name: | [____] or <choose previous calendar> ▼ | |
| Delivery Calendar Type: | 602 / 606 <select> ▼ | 604 |
| Capacity Type: | 608 <select> ▼ | |
| Time Zone for Delivery Period: | 610 <select> ▼ | |
| Time Zone for Delivery Cut-off time: | 612 <select> ▼ | |
| Region in which Calendar is Valid: | 613 <select> ▼ | |
| Effective Dates: | <from> ▼ 🗓  614 | <to> ▼ 🗓  616 |

| Day of week | Delivery period available for customer to select | Cut-off time | | Additional charges for this delivery window | Capacity |
|---|---|---|---|---|---|
| | | Same day | Next day | Per-item charge | |
| M ☑ | <from> ▼ <to> ▼ | <select> ▼ | <select> ▼ | $ | <#> ▼ |
| Tu ☑ | <from> ▼ <to> ▼ | <select> ▼ | <select> ▼ | $ | <#> ▼ |
| W ☑ | <from> ▼ <to> ▼ | <select> ▼ | <select> ▼ | $ | <#> ▼ |
| Th ☑ | <from> ▼ <to> ▼ | <select> ▼ | <select> ▼ | $ | <#> ▼ |
| F ☑ | <from> ▼ <to> ▼ | <select> ▼ | <select> ▼ | $ | <#> ▼ |
| Sa ☑ | <from> ▼ <to> ▼ | <select> ▼ | <select> ▼ | $ | <#> ▼ |
| Su ☑ | <from> ▼ <to> ▼ | <select> ▼ | <select> ▼ | $ | <#> ▼ |
| 618 | 620 | 622 | 624 | 626 | 628 |

SYSTEM AND METHOD FOR SCHEDULED DELIVERY OF SHIPMENTS WITH MULTIPLE SHIPMENT CARRIERS

PRIORITY INFORMATION

This application claims benefit of priority to U.S. Provisional Patent Application No. 61/255,901 filed Oct. 29, 2009 titled "System And Method For Scheduled Delivery Of Shipments With Multiple Shipment Carriers" which is hereby incorporated by reference herein in its entirety.

BACKGROUND

Electronic marketplaces, such as those available via the Internet, offer goods and services to customers. In contrast to many retail shopping experiences, customers of electronic marketplaces typically do not purchase items in person. Instead, customers may browse through electronic item descriptions, which may include textual descriptions of items as well as photographs or other electronic representations of a product of interest. In one example, item descriptions may be viewed as web pages on the Internet via a web browser. To purchase an item, a customer may engage in a checkout process whereby the electronic marketplace collects the requisite information for processing a transaction. Such information may include shipping and billing information for the customer as well as financial information, such as credit or bank information associated with an account from which funds for the purchase should be debited. Some checkout processes will provide the customer with one or more shipping options, such as regular shipping or expedited shipping. Such shipping options will typically allow a customer to select a shipping service that may purport to guarantee delivery of a purchased item by a certain date. Even in such cases, the degree of uncertainty as to when an item will actually arrive at a customer's designated shipping destination may result in an unfavorable shopping experience for the customer.

BRIEF DESCRIPTION OF THE DRAWINGS

FIG. 5 illustrates a network-based user interface display including an order review and confirmation page with a scheduled delivery tool, according to some embodiments.

FIG. 6 illustrates a user interface display for the submission of delivery availability information, according to some embodiments.

Figure 1:
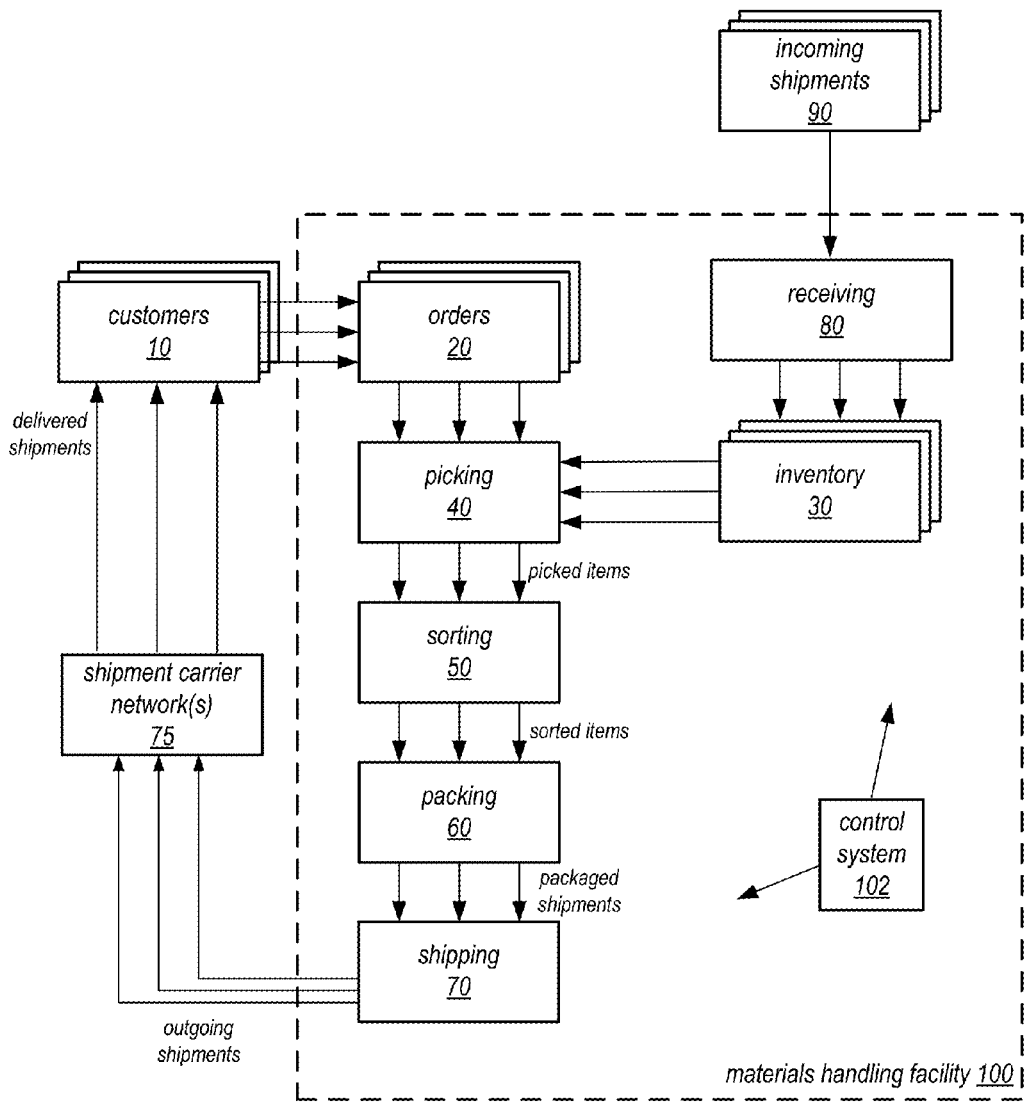
FIG. 1 illustrates a logical representation of a materials handling facility in the system and method for scheduled delivery of shipments with multiple shipment carriers, according to some embodiments.

While the system and method for scheduled delivery of shipments with multiple shipment carriers is described herein by way of example for several embodiments and illustrative drawings, those skilled in the art will recognize that the system and method for scheduled delivery of shipments with multiple shipment carriers is not limited to the embodiments or drawings described. It should be understood, that the drawings and detailed description thereto are not intended to limit the system and method for scheduled delivery of shipments with multiple shipment carriers to the particular form disclosed, but on the contrary, the intention is to cover all modifications, equivalents and alternatives falling within the spirit and scope of the system and method for scheduled delivery of shipments with multiple shipment carriers as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for scheduled delivery of shipments with multiple shipment carriers are described. Various embodiments may include a scheduled delivery component configured to receive delivery availability information for multiple shipment carriers. In various embodiments, for each shipment carrier, delivery availability information may specify one or more delivery periods during which that shipment carrier is available to deliver shipments of one or more items to designated locations. In some embodiments, the scheduled delivery component may collect and aggregate the delivery availability information within a database of delivery availability information. In various embodiments, this delivery availability information may be utilized to generate a scheduled delivery tool that enables users to select a particular delivery period during which an item is to be delivered. For example, the scheduled delivery tool may be implemented as part of an electronic marketplace, such as an electronic marketplace accessible via one or more networks (e.g., the Internet). In various embodiments, the scheduled delivery tool may be provided as part an item detail page (described below) or an order completion process (also described below). The scheduled delivery tool may provide multiple selectable delivery periods based on the delivery availability information of multiple shipment carriers. In some embodiments, the scheduled delivery tool may include a graphical calendar with multiple selectable delivery periods during which an item is to be delivered. The scheduled delivery component may determine that a particular delivery period has been selected and generate a delivery instruction based on such selection. For instance, the scheduled delivery component may identify a shipment carrier that corresponds to the selected delivery period and provide the delivery instruction to that shipment carrier. The delivery instruction may specify that a shipment including one or more items (e.g., one or more purchased items) is to be delivered during the selected time period. In some cases, this delivery instruction may be included as part of a shipment manifest (described in more detail below).

FIG. 1 illustrates a logical representation or view of the operation of a materials handling facility 100 of various embodiments of the system and method for scheduled delivery of shipments with multiple shipment carriers. In various embodiments, a fulfillment network including multiple materials handling facilities (each of which may be configured in a manner similar to that of materials handling facility 100) may be responsible for fulfilling multiple orders placed through an electronic commerce ("e-commerce") portal, which is described in more detail below.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 10 may submit orders 20 to the product distributor through an e-commerce portal or other electronic marketplace, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 102). A picked, packed and shipped order does not necessarily include all of the items ordered by the customer; an outgoing shipment to a customer may include only a subset of the ordered items available to ship at one time from an inventory storage location.

A materials handling facility may also include a receiving 80 operation for receiving shipments of stock (e.g., units of inventory items) from one or more sources (e.g., vendors) and for moving or "stowing" the received stock into stock storage (e.g., inventory 30). The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 70 may be transferred to one or more shipment carrier network(s) 75. Each shipment carrier's network may include one or more distribution facilities for storing items as well as vehicles for conveying shipments from such distribution facilities and/or materials handling facilities (such as materials handling facility 100) to various destinations (e.g., customer specified destinations). Examples of customer specified destinations may include a customer's residence or a pick up location (e.g., a retail place of commerce).

Figure 2:
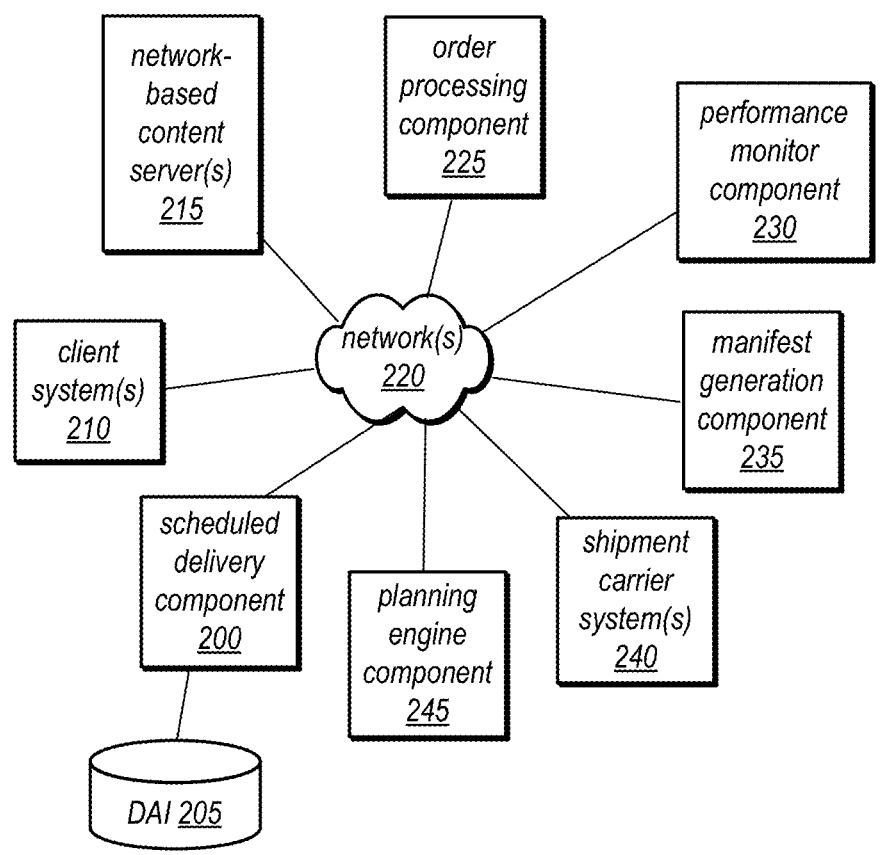
FIG. 2 illustrates a block diagram of an example system configuration, according to some embodiments.

FIG. 2 illustrates one example of a system configuration configured to implement various embodiments. Note that FIG. 2 is described collectively with subsequent Figures. In the illustrated embodiment, one or more network-based content server(s) 215 may provide an e-commerce portal accessible to one or more clients systems 210. For instance, network-based content server(s) 215 may provide one or more web pages or other network-based content representing an electronic marketplace to client system(s) 210. Such an electronic marketplace may include an electronic catalog of items which may be browsed by client system(s) 210 (which may operate under the direction of a user or customer). It should be understood that references to client system 210 providing information to network-based content server(s) 215 may include client system 210 providing information that was obtained from a user of client system 210. Such user may be a customer of the electronic marketplace provided by network-based content servers 215.

In various embodiments, the electronic catalog of the electronic marketplace may include, for each item offered for sale via the e-commerce portal, a corresponding item detail page. An item detail page may include information about a respective item, such as specifications (e.g., weight or dimensions), photographs or other pictures, videos, marketing material, or other information pertaining to the respective item. Generally speaking, the item detail page may include any information that may assist a customer in determining whether to purchase an item.

Figure 3:
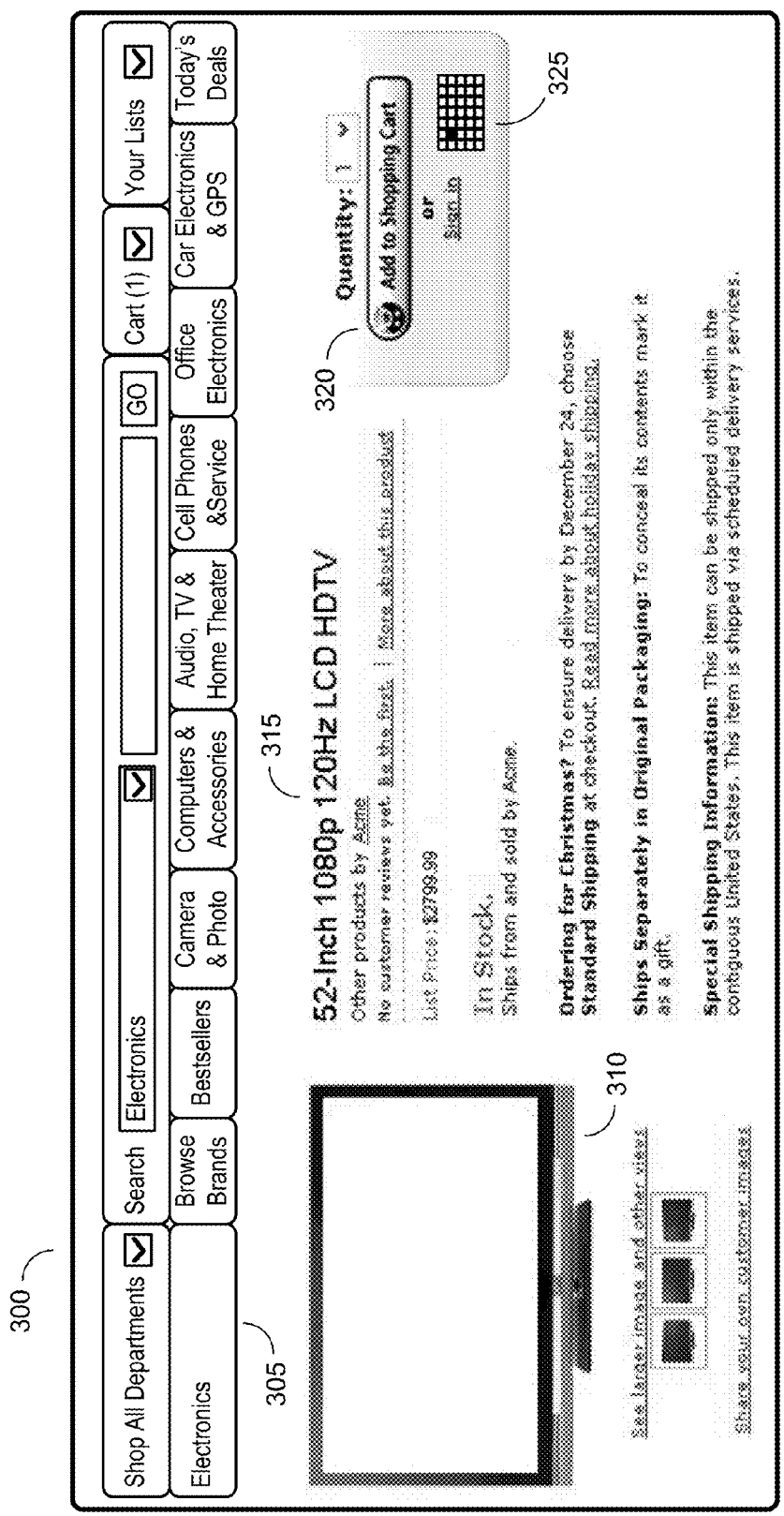
FIG. 3 illustrates a network-based user interface display including an item detail page, according to some embodiments.

FIG. 3 illustrates one example of a user interface display 300 that includes such a product detail page. In various embodiments, network-based content server(s) 215 may provide to client system(s) 210 the data and/or program instructions that define such a user interface display. For instance, user interface 300 may be defined by data and/or program instructions that may be interpreted by a web browser of client system(s) 210 and presented on a display of such systems. In the illustrated embodiment, user interface display 300 may include one or more controls for browsing an en electronic marketplace including one or more controls 305, which may enable users of client system(s) 210 to browse various portions of an electronic marketplace, including other item detail pages for other items. In the illustrated embodiment, user interface display 300 may also include one or more photographs or images 310, which may provide visual representations of a particular item offered for sale. User interface display 300 may also include one or more textual descriptions of the item depicted by image 310, as illustrated by textual description 315. In various embodiments, such textual description may also include other information pertaining to the processing of an order for the item, such as shipping or handling information. In various embodiments, user interface display 300 may also include one or more controls for indicating that an item is to be purchased, such as control 320. In the illustrated embodiments, selection of control 320 (e.g., by a user of a client system) may indicate that the item of that item detail page is to be added to an electronic shopping cart for purchase. In other cases, selection of control 320 may serve as confirmation that the item is to be purchased (e.g., by bypassing the shopping cart).

In various embodiments, display 300 may also include a control 325, the selection of which may cause a scheduled delivery control to be displayed on the item detail page or on a subsequent display. While control 325 is illustrated as a calendar icon in the illustrated embodiments, other embodiments may utilize any of a variety of controls including but not limited to check boxes, radio buttons, text entry fields, toggle controls or any other type of user interface element. Additionally, some embodiments may include controls to specify the region of a delivery destination (e.g., an entry field to submit the zip code of a delivery destination). In other cases, the delivery destination may be determined from customer account information. For instance, a user viewing display 300 may be logged into an online account associated with stored information about the user, such as the user's address or other preferred location of delivery. In various embodiments, selection of control 325 may cause the display of a graphical scheduled delivery tool, such as schedule delivery tool 400 describe in more detail below with respect to FIG. 4. In some embodiments, scheduled delivery tool 400 may be integrated directly within the item detail page of FIG. 3.

Any information submitted via user interface 300 (e.g., by client system 210 or a user thereof) may be provided as a response to network based content server(s) 215. In one example, control 320 is selected (indicating that purchase of the respective item is desired) and an indication of such selection is provided to network-based content server 215. Note that any communication between client system(s) 210 and network-based content server(s) 215 may occur over network(s) 220, which may be configured in a manner similar to that of network 985 described in more detail with respect to FIG. 8. In response to the selection of control 320, network-based content server(s) 215 may provide additional content to client system(s) 210, such as data or information representing one or more user interfaces for completing the purchase of the item.

Figure 4:
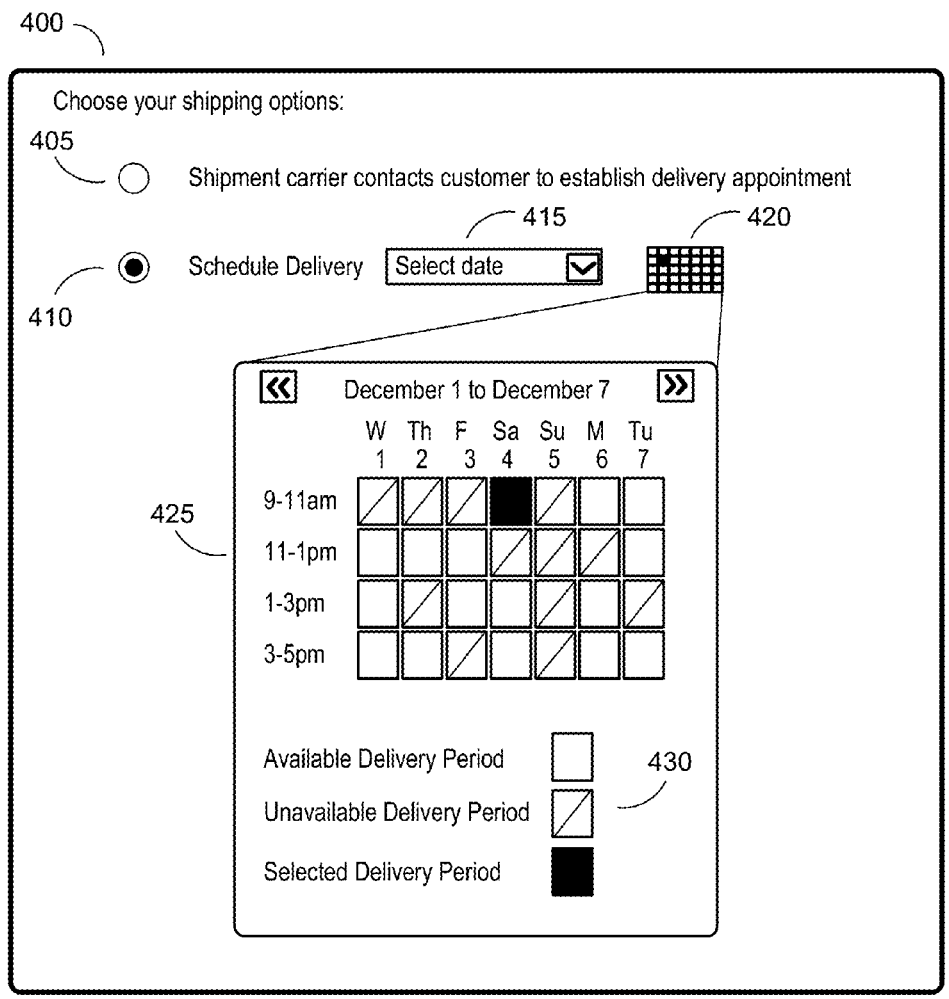
FIG. 4 illustrates a network-based user interface display including a scheduled delivery tool, according to some embodiments.

FIG. 4 illustrates one such user interface, illustrated as scheduled delivery user interface display 400. The illustrated display and various controls may be referred to herein as a scheduled delivery tool. In various embodiments, scheduled delivery user interface display 400 may be presented on a display of client system(s) 210. For instance, network-based content server(s) 215 may provide information or data representing user interface display 400 in response to determining that purchase control 320 was selected. In the illustrated embodiment, scheduled delivery user interface display 400 may include one or more controls for selecting a scheduling option. For instance, the selection of control 405 may indicate that a user prefers to be contacted by a shipment carrier to establish a delivery appointment. For instance, an agent of a shipment carrier may contact the user via telephone or electronic mail to establish a delivery appointment for delivery of the purchased item.

Selection of control 410 may indicate that the customer desires to schedule a delivery through the user interface display provided by network-based content server(s) 215. In various embodiments, a particular day (e.g., as indicated by a particular date) and a particular period of time within that day (e.g., as indicated by a particular range of the particular date) may be selected from a drop down menu, such as user interface control 415. In various embodiments, this selection may be performed in a more graphical manner by the selection of calendar control 420, which may cause the display of calendar scheduling tool 425. Calendar scheduling tool may include multiple selectable days (e.g., December 1-December 7 in the illustrated embodiment) as well as one or more selectable delivery periods for each of such days. As indicated by the legend 430, some delivery periods may not be selectable (marked as "unavailable"). In an example consistent with the illustrated embodiment, a particular day and time period within the particular day have been selected (e.g., December $4^{th}$, 9-11 am). In various embodiments, the merchant operating the electronic marketplace (e.g., the merchant controlling network-based content server(s) 215) may guarantee that delivery of the item to a designated destination address will occur during the delivery period specified. In this way, a customer may rest assured that should they need to make arrangements to be present for a delivery, such arrangements will not be made in vain as the delivery of the item will be guaranteed to occur during the selected time period of the specified day.

In various embodiments, multiple scheduled delivery tools may be provided on the same user interface display for multi-item shipments. For instance, in the illustrated embodiment of FIG. 4, a second set of controls similar to controls 410-430 may be provided for a second item in the order. In this way, the scheduled delivery tool may provide controls for independently selecting a respective delivery time for different items of the same order.

In other embodiments, scheduled delivery user interface display 400 may be integrated into the same user interface display of the item detail page. In this way, a user may set his desired scheduled delivery period prior to adding the item to an electronic shopping cart and/or before indicating that the item is to be purchased.

In various embodiments, network-based content server(s) 215 may also provide a user interface for confirming the purchase of an item as well as the scheduled delivery period described with respect to FIG. 4. FIG. 5 illustrates an example of a user interface display 500 including a confirmation page that may be presented to a user of client system(s) 210. For instance, network-based content server(s) 215 may provide data or information representing such user interface display over network 220. In various embodiments, user interface display 500 may be provided by network-based content server(s) 215 in response to the scheduling of a delivery in accordance with the user interface display of FIG. 4. In various embodiments, user interface display 500 may include one or more fields 505 for confirming the destination shipping address for the item. In various embodiments, user interface display 500 may also include one or more controls 510 for confirming or changing the scheduled delivery period, such as a delivery period scheduled in accordance with scheduled delivery user interface 400. In various embodiments, controls 510 may include controls similar to controls 415-430 of FIG. 4. Controls 510 may be utilized in cases where the user would like to change a scheduled delivery that was set at some earlier point in the order process. In other embodiments, controls 510 may represent the initial point in the order process at which the user may define his scheduled delivery period. In various embodiments, user interface 500 may also include fields 515 for viewing an order summary that specifies pricing information for the order, such as a subtotal or total cost for the order. In various embodiments user interface 500 may also include fields 520, which may include fields for specifying billing information, such as an account to be debited for the purchase (e.g., a bank account or credit account) or the billing address associated with such account.

Various components and systems illustrated in FIG. 2 may facilitate the scheduled delivery feature described above. One of such systems is scheduled delivery component 200 of FIG. 2. Scheduled delivery component 200 may in various embodiments obtain or receive delivery availability information from multiple different shipment carriers. As will be described in more detail below, this delivery availability information may in various embodiments be utilized to generate the delivery period selection tool described above with respect to FIG. 4 (e.g., controls, 415-425).

In various embodiments, delivery availability information may be received by scheduled delivery component 200 from one or more shipment carrier system(s) 240, each of which may be owned or controlled by a different shipment carrier. In other cases, scheduled delivery component 200 may include a user interface for inputting delivery availability information from one or more shipment carriers. For instance, instead of a shipment carrier system electronically transmitting delivery availability information to scheduled delivery system 200, the respective shipment carrier may in various embodiments provide a hard copy of delivery availability information. A user may input such delivery availability information into scheduled delivery component 200 via the aforesaid user interface. In various embodiments, scheduled delivery component may receive updated or new delivery availability information on a periodic or aperiodic basis.

A given shipment carrier's availability information may specify delivery periods at which the shipment carrier is available deliver an item. Such delivery periods may be specified on a per-region basis; such a region may include regions defined zip codes, cites, states, territories, or other types of defined regions. For example, delivery availability information may specify that a shipment carrier is available to deliver a specified quantity of shipments; this quantity of shipment may in various embodiments be specific to a particular region, particular day, and/or particular time period with a respective day. For instance, delivery availability information provided by a shipment carrier system 240 may indicate that the respective shipment carrier is available to deliver 10 shipments for zip code 98101 between 1:00 P.M. and 3:00 P.M. on a specific day. Such delivery availability information may include multiple other entries specifying a shipment carrier's capacity (e.g., quantity of shipments that may be handled) for other regions, days, and/or delivery periods. In some embodiments, delivery availability information may be specific to a particular type of shipments. For instance, shipments may be broken up into different categories (e.g., small, large, heavy, bulky, etc.) and the shipment carrier may have a different capacity for each of such categories.

In various embodiments, delivery availability information may be submitted through a user interface configured for the submission of delivery availability information. Such user interface may in various embodiments be provided by scheduled delivery component 200 and/or network-based content server(s) 215. For instance, a shipment carrier agent may access such user interface to provide and/or configure delivery availability information for a respective shipment carrier. In one example, a network-based content server 215 may provide such a user interface. Any information obtained via such user interface may be forwarded to scheduled delivery component 200 for inclusion within delivery availability information data store 205 (described in more detail below).

One example of a user interface display for submitting delivery availability information is illustrated in FIG. 6, as illustrated by user interface display 600. In one example, data and/or information representing such a user interface display 600 may be provided by network-based content server(s) 215 to one or more shipment carrier systems 240; agents operating such systems may submit delivery availability information via the user interface display. The submitted information may in various embodiments be provided to a network-based content server 215, which may provide the delivery availability information to scheduled delivery component 200. In other cases, delivery availability information may be provided directly to scheduled delivery component 200.

User interface display 600 may include multiple controls for submitting delivery availability information. In some embodiments, delivery availability information may include any information that may be submitted via user interface display 600. In various embodiments, user interface display 600 may include one or more controls 602 for naming a newly created calendar including delivery availability information. The user interface display may also include a control 604 for specifying that settings from a previous calendar of previously-specified delivery availability information. User interface display 600 may also include a control 606 for specifying a calendar delivery type, which may include options for specifying the granularity of a delivery period. Such options may include a "day" option, which specifies that the granularity of a delivery period is to be handled as an entire day. Such options may also include a "slot" option, which specifies that the granularity of a delivery period is to be handled as some subset of an entire day, such as a range of hours or some other time period with a given day. User interface display may also include a control 608 to specify a capacity type, which may specify the units for capacity (control 628, described below), which may include items or shipments (which may include multiple items). User interface 600 may also include a control 610 for specifying a time zone of the times that define each specified delivery period (control 620, described below). User interface display 600 may also include a control 612 for specifying the time zone of the times that specify delivery cut-offs (controls 622-624, described below). The user interface display may also include a control 613 for specifying the region in which the delivery availability information of the calendar is valid. As described above, this region may be different in various embodiments and may include, but is not limited to, regions defined zip codes, cites, states, territories, or other types of defined regions. The user interface display may also include controls 614 and 616 for specifying a time period for which the delivery availability information of the calendar is valid.

User interface display 600 may also include various controls 618-628 for specifying delivery availability information in calendar format. For instance, control 618 may specify a particular day for which a given entry (e.g., row) of the delivery availability information is valid. In the illustrated embodiment, there are seven entries, each for a different day of the week. In various embodiments, other numbers of entries may be utilized. In some cases, there may be multiple entries for the same day. In some cases, some days may have no entries. Such options may be specified by the shipment carrier. In the illustrated embodiment, controls 620 may specify a delivery period within the respective day of the same entry. In various embodiments, the delivery period may be a period of time during which the shipment carrier is available to deliver a shipment. Such delivery period may be specified at any level of time granularity. In one example, a delivery period is specified in a range of one or more hours (e.g., 12:00 pm-1:00 pm or 3:00 pm-5:00 pm). In various embodiments, the illustrated display may include controls for specifying holiday-specific delivery periods. For instance, a carrier may have no availability on holidays or may have reduced availability on holidays. In other cases, holiday-specific availability may be specified by a separate calendar altogether.

The user interface display may also include controls 622 and 624 for specifying a "cut-off time" which may be a time of day at which a shipment carrier must be notified of the shipment in order to delivery the shipment by the requested time. The illustrated embodiment includes separate controls for same day and next day (or later) shipments. In one example, a shipment carrier may need to be notified of a shipment by 12 noon in order to deliver a shipment on that same day. In another example, a shipment carrier may need to be notified of a shipment by 5 pm of a given day in order to deliver an item by the following day. In some cases, shipment carriers may utilize control 626 for specifying a charge associated with delivering shipments during the respective delivery period, although this may be optional in various embodiments. User interface display 600 may also include a control for specifying the capacity of the respective delivery period, which may specify the quantity of shipments (or items, dependent upon the units specified by control 608) that the shipment carrier is available to deliver during the respective delivery period (as specified by control 620). In one example, dependent upon available labor and transportation resources, a shipment carrier may be able to deliver ten shipments during one delivery time period and twenty shipments in another delivery time period. Of course such capacities are merely examples; actual capacities will depend on the capabilities of individual shipment carriers.

Scheduled delivery component 200 may collect and aggregate any of the aforesaid delivery availability information from multiple different shipment carriers into one or more data stores of delivery availability information, such as delivery availability information (DAI) data store 205. In various embodiments, DAI data store 205 may be configured as a database, as one or more mass storage devices (e.g., physical disks, logical volumes, etc.) configured to store data blocks or files, or in any other suitable configuration for data storage. In various embodiments, the collection and aggregation of delivery and availability information from multiple different shipment carriers may provide a comprehensive view of the available delivery options for items, such as those acquired through the electronic marketplace described above.

In various embodiments, for each shipment carrier, the delivery and availability information may be categorized into different geographical jurisdictions, which may include groupings of delivery availability information of smaller, constituent regions. For instance, as described above, delivery availability information may be provided on a per-region basis. In one example, each shipment carrier may provide delivery availability information for various zip codes. In various embodiments, natural similarities may occur across regions (e.g., zip codes, or other regions) due to the nature of a shipment carrier's shipment handling network. For instance, a shipment carrier may service multiple different zip codes (or other regions) with the same shipment handling center. For example, an entire city that spans multiple zip codes may be serviced by the same shipment handling center. Accordingly, the delivery availability information for each of such zip codes may in many cases be similar or identical. In such cases, the scheduled delivery component described herein may group such regions together for purposes of scheduled delivery. Such groupings may be referred to herein as jurisdictions. In various embodiments, the scheduled delivery component described herein may be configured to process delivery availability information at a jurisdiction level, which may in some embodiments conserve processing resources.

For a given order, scheduled delivery component 200 may be configured to generate the data, information, and/or program instructions that represent the scheduled delivery user interface tool described above (e.g., the user interface tool of FIG. 4). As described above, network-based content server(s) 215 may provide a given client system with network-based content representing one or more portions of an electronic marketplace or e-commerce portal including but not limited to various item detail pages (e.g., FIG. 3). Network-based content server(s) 215 may also provide a scheduled delivery user interface tool to any of client system(s) 210. As described above, this tool may be utilized for scheduling a delivery based on the delivery availability of multiple shipment carriers.

The information, data, and/or executable instructions representing the scheduled delivery tool may be provided to the network-based content server(s) 215 by the scheduled delivery component 200. Note that in some embodiments scheduled delivery component 200 may instead be an integrated component of network-based content server(s) 215. In various embodiments, scheduled delivery component 200 may be configured as a service interface that may be called by network-based content server(s) 215.

In various embodiments, scheduled delivery component 200 may be configured to provide network-based content server(s) 215 with information indicating multiple delivery time periods during which at least one shipment carrier is available to delivery a shipment. Network-based content server(s) 215 may provide information indicating such delivery time periods to client system(s) 210. For example, one representation of such time periods is illustrated as the available delivery periods of control 425 of FIG. 4, which may be displayed on a display of a client system 210.

In various embodiments, scheduled delivery component 200 may generate and maintain a stored representation of each shipment carrier's capacity. For instance, DAI 205 may include, for each shipment carrier, a listing of available delivery periods and the capacity of shipment for each of such periods (e.g., the quantity of shipments that may be handled by the shipment carrier during that period). In various embodiments, shipment carriers may specify this capacity, as described above with respect to control 628. Each time an order is placed and a corresponding shipment is scheduled with a shipment carrier (described in more detail below), the scheduled delivery component may decrement the corresponding capacity value. When a shipment carrier's capacity reaches zero for a given delivery period, scheduled delivery component may exclude that time period from being listed as an available delivery period for that shipment carrier. In this way, scheduled delivery component 200 may generate and maintain the contents of DAI 205 such that DAI 205 indicates a real-time or near real-time representation of each shipment carrier's capacity. In various embodiments, a shipment carrier's capacity may be specific to a particular region, jurisdiction, type of item or shipment to be delivered (e.g., small, light, large, heavy, etc.), and/or other shipment-related criteria.

While FIG. 6 illustrates a graphical display for the submission of delivery availability information, embodiments are not limited to receiving delivery availability information in this manner. For instance, in some cases (such as when large amounts of delivery availability information are to be submitted), delivery availability information may be submitted via a bulk upload template. For instance, in various embodiments, data representing such a template may include information similar to that of display 600 for multiple different geographical regions or jurisdictions. In some embodiments, a bulk upload template may be a data file (or other information) that includes delivery availability information for multiple regions, jurisdictions, and/or time periods; the template (including the delivery availability information) may be provided to scheduled delivery component 200 from one or more shipment carrier systems 240. In some embodiments, display 600 may include a control that enables a user (e.g., an agent of a shipment carrier) to upload one or more files representing the aforesaid bulk upload template (including delivery availability information).

In various embodiments, scheduled delivery component 200 may also be configured to provide a network-based programmatic interface, such as an interface adhering to a particular application programming interface (API). The programmatic interface may be configured to receive submissions of delivery availability information from the shipment carrier systems, such as shipment carrier system(s) 240 of FIG. 2. In various embodiments, shipment carrier systems(s) 240 may utilize such programmatic interface to update delivery availability information in real-time (or near real-time). Scheduled delivery component 200 may be configured to store and aggregate such real-time delivery availability information within scheduled delivery component 200. In this way, scheduled delivery component 200 may generate the selectable delivery periods of the scheduled delivery tool of FIG. 4 based on the most up-to-date delivery availability information available.

In various embodiments, the scheduled delivery component may enforce one or more constraints on the set of delivery periods that are conveyed to network-based content server(s) 215 as available delivery periods. In some embodiments, one of such constraints may include one or more blackout windows, which may be a set of days (or other time periods) during which delivery appointments cannot be scheduled irrespective of a shipment carrier's availability during that set of days. For example, in order to deliver a shipment during a scheduled delivery period for a given region or jurisdiction, a shipment carrier may require a certain period of time between when the shipment carrier is notified of a shipment delivery and when the shipment carrier can actually perform the delivery. This period of time may be referred to as shipment carrier lead time. In various embodiments, shipment carrier lead times may be different for different regions, jurisdictions, shipment service levels (e.g., same day, next day, two-day, ground, etc.) and/or shipment carriers. For instance, for the same region, one shipment carrier may only require a two hour shipment carrier lead time whereas another shipment carrier may require a two day lead time. Based on these lead times and the date and/or time at which an order is placed, the scheduled delivery component may enforce one or more blackout periods on the set of available delivery periods provided to the network-based content server(s). For instance, if an order is placed on a given day and a shipment carrier indicates that it requires a three day lead time for shipment deliveries, the scheduled delivery component 200 may ensure that delivery periods during the three days of lead time are not indicated as available delivery periods for that shipment carrier.

In various embodiments, the determination of which selectable delivery periods are included as part of the scheduled delivery tool may be based on factors or criteria other than the delivery availability information provided by the shipment carriers (described in more detail below). In various embodiments, this functionality may be performed by a planning engine component, such as planning engine component 245 of FIG. 2. In some embodiments, the planning engine component may be configured as a component separate from the scheduled delivery component. In other cases, the scheduled delivery component may include the functionality of the planning engine component.

In various embodiments, the planning engine component may be configured to enforce a lead time requirement on the selectable delivery periods provided as part of the scheduled delivery tool. This requirement may be enforced on a per-carrier basis. The planning engine component may provide selectable time periods to a user based on this requirement. One criteria on which the planning engine component may base the determination of a lead time requirement may include historical carrier performance (e.g., as measured by performance monitor component 230). For example, if prior performance of the carrier indicates the carrier requires a four day lead time to deliver an item, the planning engine component may be configured to enforce a four day lead time requirement for that carrier. This requirement may in some cases override a carrier's own delivery availability information. For example, if a shipment carrier's delivery availability information indicates that the carrier's lead time is only three days whereas the planning engine component indicates that the minimum lead time requirement for that carrier is four days, the scheduled delivery component may give preference to the planning engine component by enforcing the four day lead time requirement.

In various embodiments, the planning engine component may determine the lead time requirement based on other factors or criteria. In one example, the lead time requirement may be based on weather projections, such as projections obtained from a network-based weather service. For example, in times of inclement weather, the planning engine component may provide the scheduled delivery component with an indication that all lead times should be extended by two days to account for such inclement weather. In another example, the planning engine component may determine the lead time requirement based on a schedule of holidays (if applicable). For instance, if the order date is on or around a business holiday, the planning engine component may provide an indication to the scheduled delivery component that indicates lead times are to be extended by the length of the holiday (e.g., one day for a one day holiday). In another example, the planning engine component may determine the lead time requirement based on historical lead time of the materials handling facility preparing the shipment. For instance, historical facility performance may indicate that a five hour lead time is sufficient for one materials handling facility whereas another materials handling facility may require a two day lead time.

In any case, the lead time requirement determined by the planning engine component may be provided to the scheduled delivery component, which may filter the selectable delivery periods based on such lead time requirement. For instance, within the context of FIG. 4, if the scheduled delivery tool were accessed on 8 A.M. of December 1st and the planning engine component specified a full two business day lead time requirement, the available time periods associated with December 1st and 2nd may be removed. Note that this process may be done on a per-carrier basis. For instance, the minimum lead times enforced may be different across different shipment carriers.

In various embodiments, the set of available delivery periods that are conveyed by the scheduled delivery component to the network-based content server(s) may include available delivery periods of different shipment carriers in various embodiments. In some cases, available delivery periods of different shipment carriers may overlap. For instance, in FIG. 4, Friday December $3^{rd}$ is listed as an available delivery period, which may mean that one or possibly multiple shipment carriers are available to deliver a shipment during that delivery period. In cases where multiple shipment carriers are available to deliver a shipment during the same delivery period, the customer (e.g., user of client system(s) 210) may be given a choice of shipment carrier. In other cases, scheduled delivery component 200 may select the shipment carrier to be assigned to that shipment based on one or more economic criteria including but limited to the cost of using each shipment carrier for shipping the shipment. In cases where scheduled delivery component 200 performs such a selection, the selection may be performed at order time (e.g., during or around the time the order is placed) or at shipment time (e.g., during or around the time the order is shipped from the respective materials handling facility). In other cases, the scheduled delivery component may select among multiple shipment carriers for the same delivery period on the basis of carrier ratings (e.g., satisfaction ratings submitted by customers), customer preferences (e.g., a customer may specify that a particular carrier is not allowed to handle that customer's shipments), and/or customer requests (e.g., a customer may request that a specific carrier handle their shipment).

In various embodiments, the particular selectable delivery periods provided as part of the scheduled delivery tool may be based on delivery information pertinent to the region of the shipment destination. For instance, as described above with respect to FIG. 3, the region of the shipment destination may be specified by the user or by customer account information, according to some embodiments. The scheduled delivery component described herein may be configured to search DAI 205 for delivery available information specific to that region. For instance, as described above with respect to FIG. 6, a shipment carrier's delivery availability information (or calendar) may be valid for a specific region (as denoted by control 613 described above). When determining which selectable delivery periods to include in an instance of the scheduled delivery tool, the scheduled delivery component may be configured to exclude delivery availability information for regions other than the region corresponding to the shipment destination of the respective shipment.

Network-based content server(s) 215 may be configured to provide scheduled delivery component 200 with an indication of a selected delivery period (e.g., an indication of the delivery period selected by the customer). For instance, in FIG. 4, the selected delivery period is illustrated as December $4^{th}$ from 9 am to 11 am. The client system may send such indication to the network-based content server(s) 215, which may forward the information to scheduled delivery component 200. Scheduled delivery component 200 may update DAI 205 according to the selected delivery period, such as by decrementing the capacity value for the selected delivery period for the respective shipment carrier. In cases where the shipment carrier is decided at a later time (which may occur if multiple shipment carriers are available to deliver the shipment during the same time period), the scheduled delivery component may wait to decrement the appropriate capacity value at that time.

In addition to maintaining the delivery availability information data store 205 in the manner described above, scheduled delivery component 200 may be configured to update DAI 205 periodically or aperiodically based on newly acquired delivery availability information for any of the shipment carriers.

In various embodiments, instead of relying on a data store or database, such as DAI 205, for delivery availability information, scheduled delivery component 200 may acquire such information at order-time. For instance, network-based content server 215 may request delivery availability information (e.g., a listing of available delivery periods) from scheduled delivery component 200 at order time. In these embodiments, instead of querying DAI 205 for the current delivery availability information, scheduled delivery component 200 may request such information in real time from one or more shipment carrier systems, such as shipment carrier system(s) 240.

In various embodiments, scheduled delivery component 200 may notify a shipment carrier that one or more of the shipment carrier's available delivery periods has been selected for a particular order/shipment. This process may be referred to as scheduling a delivery period with the shipment carrier. In various embodiments, this may occur during or around the time an item is purchased. In other cases, such as when a shipment carrier is selected at or around the time the respective materials handling facility is to ship the respective item, the scheduled delivery component may be configured to notify the shipment carrier at that time.

In various embodiments, a shipment carrier may be notified of a scheduled delivery by receiving a manifest that includes an indication of such scheduled delivery. In various embodiments, manifest generation component 235 may be configured to generate such manifests. A manifest may in various embodiments include a listing of all the items or shipments on a shipment carrier's vehicle upon departure from a materials handling facility, such as the materials handling facility of FIG. 1. Manifest generation component 235 may be configured to generate data representing electronic manifests and transmit such manifests to respective shipment carriers. In various embodiments, one or more systems at a materials handling facility may generate a hard copy of such manifests to accompany the vehicle to which the manifest corresponds. In various embodiments, shipment carriers may utilize their own distribution facilities for temporarily storing shipments that are sourced from a materials handling facility. For instance, in some cases, a particular distribution facility may store shipments that are to be delivered to a particular region or jurisdiction. To support the shipment carrier's operations, the manifest generation component described herein may be configured to provide a date or other temporal indication that indicates the time and/or date at which the shipment carrier is to have a shipment delivered to such a distribution facility. This time and/or date may be based on the delivery period and the time required by the shipment carrier to deliver a shipment from the shipment carrier's respective distribution facility to the shipment's ultimate destination.

Various other systems may support the processing of an order in various embodiments. In various embodiments, order processing component 225 may be configured to process transaction-related tasks associated with the purchase of an item in the electronic marketplace provided by network-based content server(s) 215. For instance, network-based content server(s) 215 may collect account information (e.g., bank or credit account numbers) associated with an account from which funds should be debited for a purchase. In some embodiments, order processing component 225 may provide confirmation that a purchase has been completed. In some embodiments, scheduled delivery component 200 may use such confirmation as the basis for committing a scheduled delivery to DAI 205 (e.g., via decrementing a capacity value, as described above) and/or as a basis for scheduling a delivery with the respective shipment carrier.

In various embodiments, performance monitor component 230 may be configured to generate one or more performance metrics and/or reports including such metrics. In some cases, each metric may correspond to a respective shipment carrier's performance with respect to actually delivering orders during the scheduled delivery periods. To generate such metrics, the performance monitor component may be configured to, for each scheduled shipment, compare the actual delivery time to the scheduled delivery period for that shipment. In various embodiments, the actual delivery period may be self-reported by the shipment carriers or obtained from customer feedback (e.g., surveys or reviews). In various embodiments, performance metrics may be categorized into different groups on the basis of various criteria including but not limited to shipment carrier, time period (e.g., by month or season), region, jurisdiction, item type, shipment service type (e.g., same day, next day, etc.), and/or some other level of service (e.g., white glove delivery or installation services).

In various embodiments, scheduled delivery component 200 and network based content server(s) 215 may provide a rescheduling feature that supports a user's ability to reschedule a previously scheduled delivery period. For instance, such a user may utilize a client system 210 to login in to an electronic marketplace customer account provided by network-based content server(s) 215, which may provide one or more tools (similar to those of FIG. 4) for rescheduling a previously scheduled delivery period to a new delivery period. In some embodiments, this option may not be available if the shipment carrier has already been notified of the original delivery period.

Note that in various embodiments the scheduling of a delivery period according to the techniques described herein occur within an order process and/or payment process of the electronic marketplace. In this way, a user may in various embodiments conveniently schedule a shipment to be delivered during a particular delivery window at the time an item is ordered. This may in various embodiments relieve the user of having to engage in follow up communications with the shipment carrier (or other entities) in order to schedule a shipment delivery time.

In various embodiments, the techniques described above may also be applied to "drop shippers." For instance, in addition to or as an alternative to the fulfillment of shipments by materials handling facilities operated by the entity controlling scheduled delivery component 200 (e.g., materials handling facility 100), various embodiments may also include shipments originating from other entities. In some cases, instead of certain items being sent from a manufacturer to a materials handling facility and then shipped to the customer, it may be desirable for the manufacturer to hold on to such items and ship them to the customer directly. For example, for some large, heavy of bulky items, it may be more economically viable to use this approach. In such cases, scheduled delivery component 200 may be configured to provide a drop shipper with an indication of when an item needs to be prepared for shipment. The scheduled delivery component 200 may also provide an indication to a shipment carrier as to when such shipment needs to be delivered (e.g., during the delivery window selected by the customer).

In various embodiments, the scheduled delivery component 200 may be configured to provide a calendaring service accessible to authorized agents, such as customer service agents. The tools available through such calendaring service may be similar to those illustrated in FIG. 4. For example, if a customer were to contact a customer service call center, the call center agent would be able to utilize the calendar service to perform any delivery period changes on behalf of the customer.

In various embodiments, techniques similar to those presented above may be utilized to schedule shipment pickups for items to be returned. For instance, the user could log into an account with the electronic marketplace provided by network-based content server(s) 215. One of the account's features may include one or more controls for scheduling a pickup; such controls may be similar to those illustrated in FIG. 4. In these cases, for a given scheduled pickup, a respective shipment carrier may be notified of the pickup delivery period by the scheduled delivery component. In various embodiments, the scheduled delivery component may be configured to obtain shipment carrier availability information for pickups in a manner similar to that described above with respect to obtaining delivery availability information for multiple shipment carriers.

In various embodiments, users (e.g., customers) may track, modify, or cancel scheduled deliveries, even after the shipment has been conveyed to the shipment carrier. For instance, a user may submit a request to the network-based content servers (e.g., a request to track, modify, or cancel a scheduled delivery). The network-based content servers may fulfill the request by communicating with the appropriate shipment carrier systems 240 to complete the action specified by the request. For instance, a request to track a scheduled delivery may result in the retrieval of information specifying the current location of the shipment. In another example, a request to modify a scheduled delivery may result in the rescheduling of that delivery. In general, the network-based content servers may communicate with carrier systems 240 to acquire any information relevant to a scheduled delivery on behalf of the user.

Example Method(s)

The system and method for scheduled delivery of shipments with multiple shipment carriers may include various methods, examples of which are described in more detail below. In various embodiments, the methods described herein may be performed by one or more computer systems, such as the computer system described below with respect to FIG. 8. For instance, the method may be implemented by one of such computer systems or by a group of computer systems operating in a coordinated and/or distributed manner.

Figure 7:
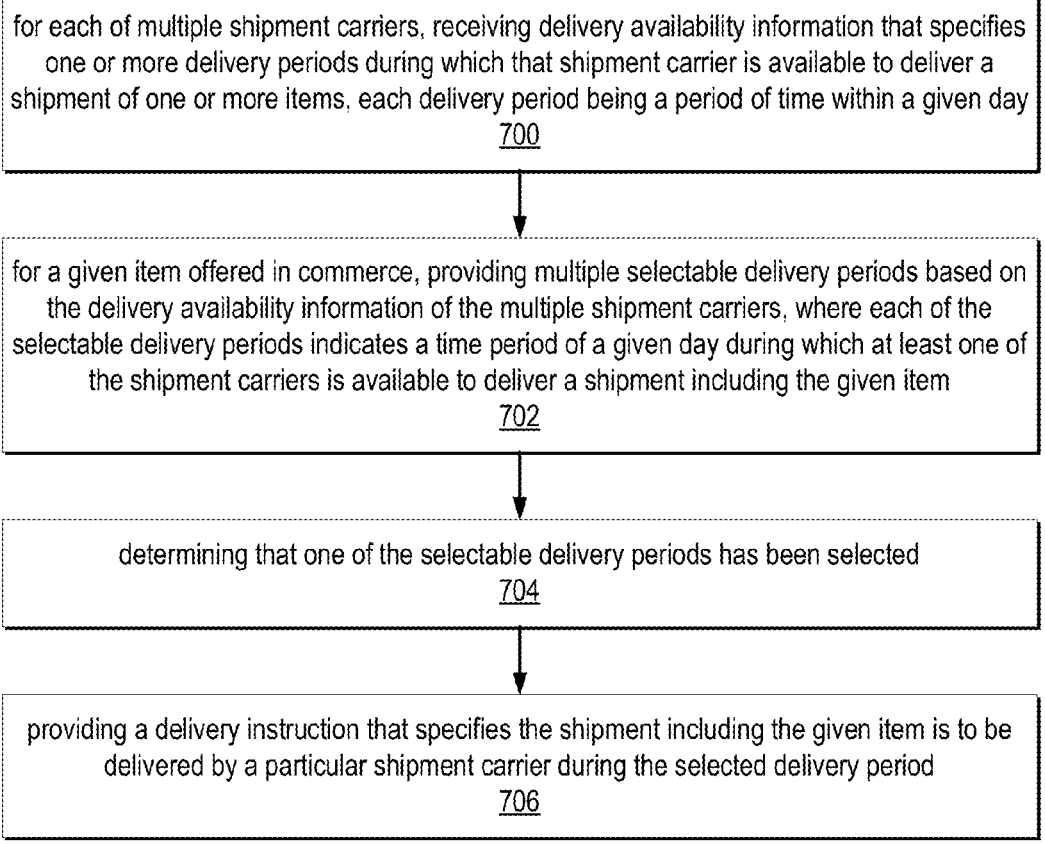
FIG. 7 illustrates a flowchart of an example method for providing scheduled delivery of shipments, according to some embodiments.

FIG. 7 illustrates a flowchart of such a method. As illustrated by block 700, the method may include, for each of multiple shipment carriers, receiving delivery availability information that specifies one or more delivery periods during which that shipment carrier is available to deliver a shipment of one or more items. In various embodiments, each delivery period may be a period of time within a given day (e.g., a range of hours less than an entire day). In some embodiments, receiving such delivery availability information may include receiving any of the delivery availability information described above, such as the delivery availability information stored in delivery availability information data store 205. In one example, the receipt of such information may include receiving delivery availability information from one or more shipment carrier systems, such as described above with respect to shipment carrier systems 240.

In some embodiments, the method may include providing a network-based user interface for submitting delivery availability information. For example, the method may include providing a network-based user interface in a manner similar to that described above with respect to the scheduled delivery component 200; FIG. 6 illustrates one example of such a user interface. Accordingly, receiving delivery availability information may include receiving delivery availability information through such a network-based user interface.

As illustrated by block 702, the method may include, for a given item offered in commerce (e.g., an item offered for sale via the electronic marketplace or e-commerce portal described above), providing multiple selectable delivery periods based on the delivery availability information of the multiple shipment carriers. Each of the selectable delivery periods may indicate a time period of a given day during which at least one of the shipment carriers is available to deliver a shipment including the given item. For instance, the method may include providing such delivery periods to a client system, such as described above with respect to network-based content server(s) 215. Another example of providing such selectable time periods may include scheduled delivery component 200 providing delivery time periods to network-based content server(s) 215. In various embodiments, providing multiple selectable delivery periods may include providing the selectable delivery periods within network-based content, such as part of an item detail page or a scheduled delivery tool, such as that illustrated with respect to FIG. 4. In various embodiments, such network-based content may include content representing an order completion process for purchasing the given item. For instance, an order completion process may include using an electronic marketplace to purchase an item (as described above). For example, a user might indicate that an item is to be purchased by adding that item to an electronic shopping cart and providing payment and shipping details. In various embodiments, any portion of an order completion process may include content representing multiple selectable delivery periods in accordance with the method.

As illustrated by block 704, the method may include determining that one of the selectable delivery periods has been selected. For example, if the selectable delivery periods were provided via a network-based user interface (e.g., the user interface of FIG. 4), the method may include receiving a selection of one of the delivery periods through the same interface. In various embodiments, determining that such a selection has been made may include receiving an indication of the selection from a computer system, examples of which include network-based content server(s) 215 receiving such a selection from a client system or scheduled delivery component 200 receiving an indication of such a selection from network based content server(s) 215.

In various embodiments, the method may also include providing a delivery instruction that specifies the shipment including the given item is to be delivered by a particular shipment carrier during the selected delivery period. In various embodiments, providing such a delivery instruction may include notifying the shipment carrier of the delivery period, such as performed by the scheduled delivery component described above. In various embodiments, providing such a delivery instruction may include generating a manifest that includes an indicating of a delivery period during which a shipment carrier is to deliver an item. As described above, the manifest may specify one or more items to be shipped by the shipment carrier on a vehicle departing from a materials handling facility.

As described above, in various embodiments, multiple shipment carriers may be available to deliver a particular item during the selected time period. In such cases, the method may include determining that the multiple shipment carriers are available to deliver the shipment during the selected time period. The method may also include comparing the costs associated with each shipment carrier. For instance, the method may include determining that a cost associated with a particular shipment carrier delivering the shipment during the selected delivery period is less than a cost associated with the delivery of the shipment by one or more other shipment carriers. In various embodiments, such costs may be specified by shipment carriers as delivery availability information (e.g., a cost specified by control 626). In various embodiments, the method may include providing the delivery instruction to that particular shipment carrier.

Example Computer System

Various embodiments of a system and method for scheduled delivery of shipments with multiple shipment carriers, as described herein, may be executed on one or more computer systems, which may interact with various other devices. Note that any component, action, or functionality described above with respect to FIGS. 1-7 may be implemented via one or more computer systems configured as computer system 900 of FIG. 8, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements. For instance, one or more nodes might implement network-based content server(s) 215 and one or more other nodes might implement scheduled delivery component 200.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 implementing scheduled delivery component 200 (configured as described above) and DAI 205 (as described above) are shown stored within system memory 920. Additionally, data 932 of memory 920 may store any of the information or data structures described above, in some embodiments. In some embodiments, program instructions and/or data may be received, sent or stored upon different types of computer-accessible media or on similar media separate from system memory 920 or computer system 900. While computer system 900 is illustrated as implementing the functionality of scheduled delivery component 200, any of the components or systems illustrated above with respect to FIG. 2, may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices (e.g., any other component of FIG. 2, as described above) attached to a network 985 (which may be similar to or the same as network 220 described above) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 8:
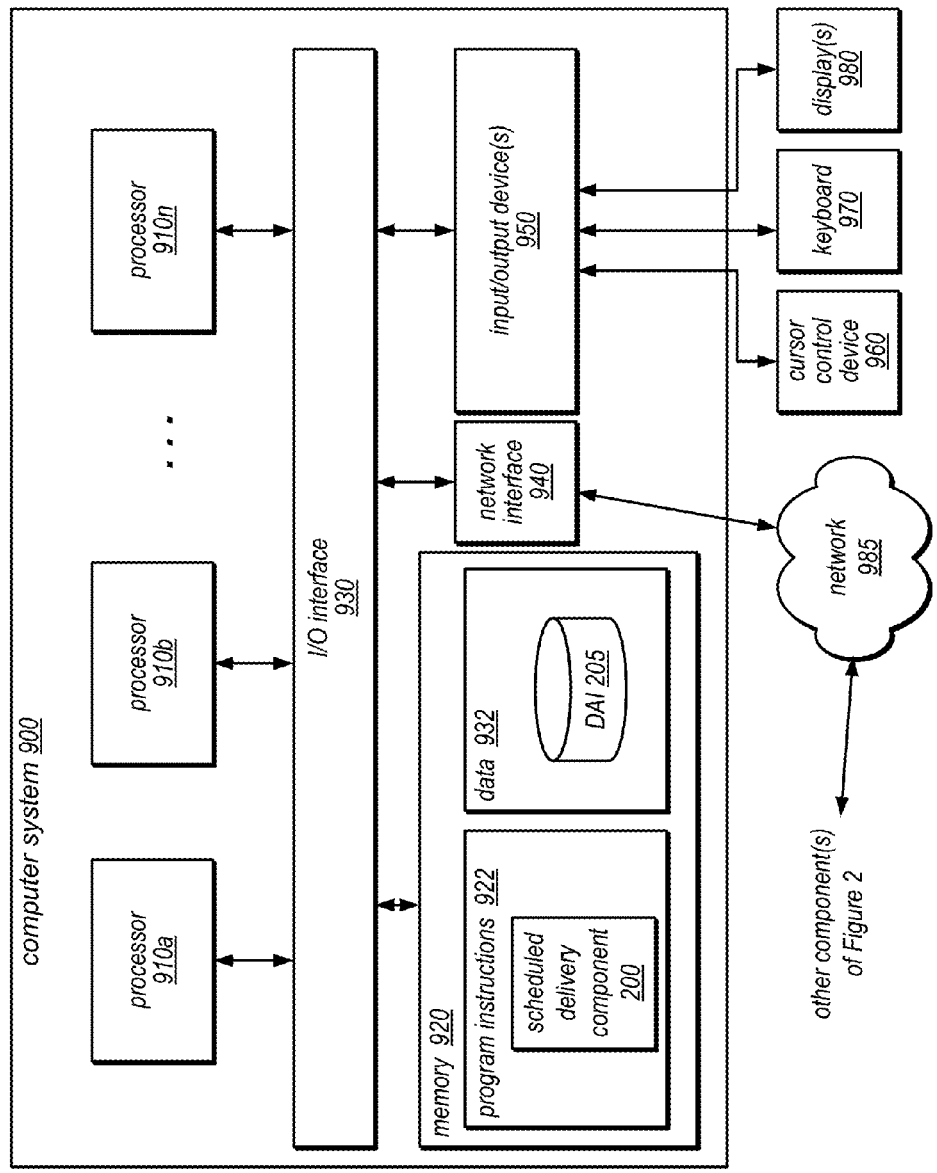
FIG. 8 illustrates one example of a computer system suitable for implementing various elements of the system and method for scheduled delivery of shipments with multiple shipment carriers, according to some embodiments.

As shown in FIG. 8, memory 920 may include program instructions 922 configured to implement any element or action described above, such as the functionality of scheduled delivery component 200. In one embodiment, the program instructions may implement the methods described above, such as the method illustrated by FIG. 7. In other embodiments, different elements and data may be included. Note that data 932 may include any data described above with respect to FIGS. 1-7.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method, comprising:
performing, by one or more computing devices implementing a scheduled delivery component:
receiving, by the scheduled delivery component, delivery availability information for each of multiple shipment carriers, wherein the delivery availability information specifies one or more delivery periods during which that shipment carrier is available to deliver a shipment of one or more items, wherein each delivery period is a period of time within a given day;
for a given item offered in commerce, determining, by the scheduled delivery component, a plurality of selectable delivery periods, wherein said determining is based on the delivery availability information of the multiple shipment carriers; wherein each of the selectable delivery periods indicates a time period of a given day during which at least one of the shipment carriers is available to deliver a shipment including the given item for a shipper of the given item;
providing, by the scheduled delivery component, the plurality of selectable delivery periods;
determining that one of the selectable delivery periods has been selected by a user to schedule delivery of the given item during the selected delivery period, wherein the user is distinct from the shipper; and providing a delivery instruction, wherein the delivery instruction specifies that the shipment including the given item is to be delivered by a particular shipment carrier during the selected delivery period.

2. The method of claim 1, wherein said providing, by the scheduled delivery component, the plurality of selectable delivery periods comprises providing the plurality of selectable delivery periods as part of network-based content.

3. The method of claim 2, wherein said network-based content includes one or more of: content representing an item detail page for the given item and content representing at least a portion of an order completion process for purchasing the given item.

4. The method of claim 1, wherein said providing, by the scheduled delivery component, the plurality of selectable delivery periods comprises providing a graphical calendar comprising the selectable delivery periods.

5. The method of claim 4, wherein determining that one of the selectable delivery periods has been selected comprises determining that one of the delivery periods of the graphical calendar has been selected.

6. The method of claim 1, wherein providing the delivery instruction comprises generating a manifest comprising the delivery instruction, wherein the manifest specifies one or more items to be shipped by the particular shipment carrier on a vehicle departing from a materials handling facility.

7. The method of claim 1, wherein the method comprises providing a network-based interface for submitting delivery availability information, wherein said receiving the delivery availability information comprises receiving delivery availability information through that network-based interface.

8. The method of claim 1, wherein the method comprises:
storing the delivery availability information of the multiple shipment carriers in a database of delivery availability information; and
periodically or aperiodically updating the database with new delivery availability information from said multiple shipment carriers;
wherein the plurality of selectable delivery periods that are provided are based on the updated database of delivery availability information.

9. The method of claim 1, wherein the method comprises:
determining that multiple shipment carriers are available to deliver the shipment including the given item during the selected delivery period;
selecting one of the multiple shipment carriers based on one or more of: a respective shipping cost of each of the multiple shipment carriers, one or more customer ratings of the multiple shipment carriers, or one or more customer shipping preferences; and
providing the delivery instruction to the selected shipment carrier.

10. The method of claim 1, wherein said determining, by the scheduled delivery component, a plurality of selectable delivery periods comprises determining the particular selectable delivery periods to provide based on one or more of: a materials handling facility lead time, a weather projection, a measure of historical shipment carrier performance, or a holiday schedule.

11. A system, comprising:
a memory; and
one or more processors coupled to the memory, wherein the memory comprises program instructions executable by the one or more processors to implement a scheduled delivery component configured to:

receive, by the scheduled delivery component, delivery availability information for each of multiple shipment carriers, wherein the delivery availability information specifies one or more delivery periods during which that shipment carrier is available to deliver a shipment of one or more items, wherein each delivery period is a period of time within a given day;

for a given item offered in commerce, determine, by the scheduled delivery component, a plurality of selectable delivery periods, wherein said determining is based on the delivery availability information of the multiple shipment carriers; wherein each of the selectable delivery periods indicates a time period of a given day during which at least one of the shipment carriers is available to deliver a shipment including the given item for a shipper of the given item;

provide, by the scheduled delivery component, the plurality of selectable delivery periods;

determine that one of the selectable delivery periods has been selected by a user to schedule delivery of the given item during the selected delivery period, wherein the user is distinct from the shipper; and provide a delivery instruction, wherein the delivery instruction specifies that the shipment including the given item is to be delivered by a particular shipment carrier during the selected delivery period.

12. The system of claim 11, wherein to provide, by the scheduled delivery component, the plurality of selectable delivery periods the program instructions are configured to provide the plurality of selectable delivery periods as part of network-based content.

13. The system of claim 12, wherein said network-based content includes one or more of: content representing an item detail page for the given item and content representing at least a portion of an order completion process for purchasing the given item.

14. The system of claim 11, wherein to provide, by the scheduled delivery component, the plurality of selectable delivery periods the program instructions are configured to provide a graphical calendar comprising the selectable delivery periods.

15. The system of claim 14, wherein to determine that one of the selectable delivery periods has been selected the program instructions are configured to determine that one of the delivery periods of the graphical calendar has been selected.

16. The system of claim 11, wherein to provide the delivery instruction the program instructions are configured to generate a manifest comprising the delivery instruction, wherein the manifest specifies one or more items to be shipped by the particular shipment carrier on a vehicle departing from a materials handling facility.

17. The system of claim 11, wherein the program instructions are configured to provide a network-based interface for submitting delivery availability information, wherein to receive the delivery availability information the program instructions are configured to receive delivery availability information through that network-based interface.

18. The system of claim 11, wherein the program instructions are configured to:
store the delivery availability information of the multiple shipment carriers in a database of delivery availability information; and
periodically or aperiodically update the database with new delivery availability information from said multiple shipment carriers;

wherein the plurality of selectable delivery periods that are provided are based on the updated database of delivery availability information.

19. The system of claim 11, wherein the program instructions are configured to:
   determine that multiple shipment carriers are available to deliver the shipment including the given item during the selected delivery period;
   select one of the multiple shipment carriers based on one or more of: a respective shipping cost of each of the multiple shipment carriers, one or more customer ratings of the multiple shipment carriers, or one or more customer shipping preferences; and
   provide the delivery instruction to the selected shipment carrier.

20. The system of claim 11, wherein, to determine, by the scheduled delivery component, a plurality of selectable delivery periods the program instructions are configured to determine the particular selectable delivery periods to provide based on one or more of: a materials handling facility lead time, a weather projection, a measure of historical shipment carrier performance, or a holiday schedule.

21. A non-transitory, computer-readable storage medium, storing program instructions computer-executable on a computer system to implement a scheduled delivery component to:
   receive, by the schedule delivery component, delivery availability information for each of multiple shipment carriers, wherein the delivery availability information specifies one or more delivery periods during which that shipment carrier is available to deliver a shipment of one or more items, wherein each delivery period is a period of time within a given day;
   for a given item offered in commerce, determine, by the scheduled delivery component, a plurality of selectable delivery periods, wherein said determining is based on the delivery availability information of the multiple shipment carriers; wherein each of the selectable delivery periods indicates a time period of a given day during which at least one of the shipment carriers is available to deliver a shipment including the given item for a shipper of the given item;
   provide, by the scheduled delivery component, the plurality of selectable delivery periods;
   determine that one of the selectable delivery periods has been selected by a user to schedule delivery of the given item during the selected delivery period, wherein the user is distinct from the shipper; and
   provide a delivery instruction, wherein the delivery instruction specifies that the shipment including the given item is to be delivered by a particular shipment carrier during the selected delivery period.

22. The non-transitory, computer-readable storage medium of claim 21, wherein to provide, by the scheduled delivery component, the plurality of selectable delivery periods the program instructions are configured to provide the plurality of selectable delivery periods as part of network-based content.

23. The non-transitory, computer-readable storage medium of claim 21, wherein said network-based content includes one or more of: content representing an item detail page for the given item and content representing at least a portion of an order completion process for purchasing the given item.

24. The non-transitory, computer-readable storage medium of claim 21, wherein to provide, by the scheduled delivery component, the plurality of selectable delivery periods the program instructions are configured to provide a graphical calendar comprising the selectable delivery periods.

25. The non-transitory, computer-readable storage medium of claim 24, wherein to determine that one of the selectable delivery periods has been selected the program instructions are configured to determine that one of the delivery periods of the graphical calendar has been selected.

26. The non-transitory, computer-readable storage medium of claim 21, wherein to provide the delivery instruction the program instructions are configured to generate a manifest comprising the delivery instruction, wherein the manifest specifies one or more items to be shipped by the particular shipment carrier on a vehicle departing from a materials handling facility.

27. The non-transitory, computer-readable storage medium of claim 21, wherein the program instructions are configured to provide a network-based interface for submitting delivery availability information, wherein to receive the delivery availability information the program instructions are configured to receive delivery availability information through that network-based interface.

28. The non-transitory, computer-readable storage medium of claim 21, wherein the program instructions are configured to:
   store the delivery availability information of the multiple shipment carriers in a database of delivery availability information; and
   periodically or aperiodically update the database with new delivery availability information from said multiple shipment carriers;
   wherein the plurality of selectable delivery periods that are provided are based on the updated database of delivery availability information.

29. The non-transitory, computer-readable storage medium of claim 21, wherein the program instructions are configured to:
   determine that multiple shipment carriers are available to deliver the shipment including the given item during the selected delivery period;
   select one of the multiple shipment carriers based on one or more of: a respective shipping cost of each of the multiple shipment carriers, one or more customer ratings of the multiple shipment carriers, or one or more customer shipping preferences; and
   provide the delivery instruction to the selected shipment carrier.

30. The non-transitory, computer-readable medium of claim 21, wherein, to determine, by the scheduled delivery component, a plurality of selectable delivery periods, the program instructions are configured to determine the particular selectable delivery periods to provide based on one or more of: a materials handling facility lead time, a weather projection, a measure of historical shipment carrier performance, or a holiday schedule.

* * * * *